US010274215B2

(12) United States Patent
Lei et al.

(10) Patent No.: US 10,274,215 B2
(45) Date of Patent: Apr. 30, 2019

(54) HYBRID REFRIGERATION AIR-CONDITIONING UNIT

(71) Applicant: Huizhou Hicool Climate Equipment Co., Ltd., Huizhou, Guangdong (Province) (CN)

(72) Inventors: Ning Lei, Huizhou (CN); Chao Lei, Huizhou (CN); Baoqiang Li, Huizhou (CN)

(73) Assignee: Huizhou Hicool Climate Equipment Co., Ltd., Huizhou (CN)

(*) Notice: Subject to any disclaimer, the term of this patent is extended or adjusted under 35 U.S.C. 154(b) by 433 days.

(21) Appl. No.: 15/021,437

(22) PCT Filed: Oct. 1, 2013

(86) PCT No.: PCT/CN2013/084804
§ 371 (c)(1),
(2) Date: Mar. 11, 2016

(87) PCT Pub. No.: WO2015/035678
PCT Pub. Date: Mar. 19, 2015

(65) Prior Publication Data
US 2016/0223212 A1    Aug. 4, 2016

(30) Foreign Application Priority Data
Sep. 11, 2013  (CN) .......................... 2013 1 0411456

(51) Int. Cl.
*F24F 6/02*       (2006.01)
*F24F 5/00*       (2006.01)
(Continued)

(52) U.S. Cl.
CPC .............. *F24F 5/0007* (2013.01); *F24F 1/02* (2013.01); *F24F 5/001* (2013.01); *F24F 5/0035* (2013.01);
(Continued)

(58) Field of Classification Search
CPC .. F24F 13/20; F24F 1/02; F24F 5/0035; F24F 13/08; F24F 6/02; F24F 5/0007; F24F 5/001; F24F 2221/36; F24F 13/30
See application file for complete search history.

(56) References Cited

U.S. PATENT DOCUMENTS

| | | | | |
|---|---|---|---|---|
| 4,911,227 A | * | 3/1990 | Saito ..................... | F28D 19/042 165/10 |
| 5,758,511 A | * | 6/1998 | Yoho ...................... | F24F 3/1411 62/271 |

(Continued)

FOREIGN PATENT DOCUMENTS

| | | | | |
|---|---|---|---|---|
| CN | 102003760 A | * | 4/2011 | ............... F24F 3/14 |
| CN | 102003760 A | * | 4/2011 | ............... F24F 3/14 |

(Continued)

OTHER PUBLICATIONS

"Machine Translation of CN102305443, Xiang Jun. 2012".*
"Machine Translation of CN102003760, Ning, Apr. 2011".*

*Primary Examiner* — Frantz F Jules
*Assistant Examiner* — Martha Tadesse
(74) *Attorney, Agent, or Firm* — Wayne & Ken, LLC; Tony Hom

(57) ABSTRACT

Disclosed is a hybrid refrigeration full fresh air-conditioning unit, which achieves multistage cooling by means of the combination of a surface cooler cooling system, a refrigerant air-conditioning system and a direct expansion type air-conditioning system. The unit has an outdoor side mainly for cool water supply to a cooler (115) and conducting heat dissipation on a condenser (212) and an indoor side mainly for conducting multistage treatment of air entering a room. The indoor side and the outdoor side are connected to form a whole and are isolated via a panel. The refrigerant air-conditioning system cooperates with one or two of the other systems. Each system can independently operate or simul- (Continued)

taneously operate together so that temperature and humidity control for all-weather can be provided, and their operation can be conducted in the most economical and environmental friendly manner under different temperature and humidity condition.

8 Claims, 2 Drawing Sheets

(51) Int. Cl.
*F24F 13/08* (2006.01)
*F24F 13/20* (2006.01)
*F24F 1/02* (2019.01)
*F24F 13/30* (2006.01)

(52) U.S. Cl.
CPC .............. *F24F 13/08* (2013.01); *F24F 13/20* (2013.01); *F24F 13/30* (2013.01); *F24F 6/02* (2013.01); *F24F 2221/36* (2013.01)

(56) References Cited

U.S. PATENT DOCUMENTS

| | | | | |
|---|---|---|---|---|
| 6,082,125 A | * | 7/2000 | Savtchenko | F25B 41/046 62/199 |
| 8,104,306 B1 | * | 1/2012 | Elsner | F24F 13/222 62/304 |
| 2003/0150234 A1 | * | 8/2003 | Ohmi | F24F 5/0035 62/309 |
| 2013/0167577 A1 | * | 7/2013 | Street | F24F 12/001 62/408 |

FOREIGN PATENT DOCUMENTS

| | | | | |
|---|---|---|---|---|
| CN | 102305443 A | * | 6/2012 | ................ F24F 3/14 |
| WO | WO-2012075656 A1 | * | 6/2012 | ................ F24F 3/14 |
| WO | WO 2012127069 A1 | * | 9/2012 | .............. F24F 3/044 |
| WO | WO-2012127069 A1 | * | 9/2012 | .............. F24F 3/044 |

* cited by examiner

HYBRID REFRIGERATION AIR-CONDITIONING UNIT

BACKGROUND OF THE PRESENT INVENTION

Field of Invention

The present invention relates to air-conditioning, and more particularly to a air-conditioning unit with hybrid cooling.

Description of Related Arts

Chlorodifluoromethane (R22) is a type of low temperature refrigerant which can obtain a refrigerant temperature of −80° C. R22 is a colorless and almost odorless gas at room temperature and is non-flammable, non-explosive and non-corrosive. Both the chemical stability and thermos-stability of R22 is very high. Particularly, in the absence of water moisture, no reaction with general metal will occur below 200° C. When water does exist, only reaction with a base will occur slowly. Though cleavage will occur under high temperature, it is still a safe refrigerant.

Air-conditioning unit refers to a device which utilizes refrigerant such as R22 to produce cold water at 7-12° C. by heat exchange through the work done by a compressor to provide the cold water to the air-conditioned box at the terminal end, and is classified into two main categories, which are air-cooled and water-cooled.

At present, the air-conditioning device which is used by most users in the market is the air-conditioning unit which employs a compressor and a refrigerant system. The energy efficiency ratio of this type of air-conditioning unit is about 3.0. Since R22 is the most common refrigerant being used, the ozone depletion index is 0.05 and the global warming index is 0.34.

At present, some types of air-conditioning device which utilize water-cooled arrangement also appear in the market. For example, Chinese patent CN01270637.X disclosed a water-curtain fan air-conditioning device and CN99220698.7 disclosed an energy-saving water-cooled air-conditioning device. The majority of this type of conventional water-cooled air-conditioning are composed of water curtain, fan, water supply system and related parts. This type of water-cooled air-conditioning device has a very small temperature difference between the air inlet and outlet, which is usually only about 5~8° C., and the outlet humidity is as high as 95%, and the output air always carries water droplets. At present, though this type of water-cooled air-conditioning device can achieve the object of energy-saving, the effect is not satisfactory and further researches and improvements are needed.

SUMMARY OF THE PRESENT INVENTION

An object of the present invention is to provide a air-conditioning unit with hybrid cooling arrangement which is of high efficiency of heat exchange, energy saving and environmental friendly.

A air-conditioning unit with hybrid cooling which comprises a chassis and a refrigerant air-conditioning system provided inside the chassis, the air-conditioning unit further comprising at least one of a surface cooler cooling system and a direct evaporation type air-conditioning system inside the chassis; the chassis comprises a first compartment and a second compartment; the refrigerant air-conditioning system comprises a compressor, a condenser, an expansion valve and an exhaust fan which are positioned inside the first compartment; and an evaporator and a first fan unit which are positioned inside the second compartment; the surface cooler system comprises a first water storage tank, a first pump and a first heat exchanger provided inside the first compartment; and a cooler provided inside the second compartment, wherein the first water storage tank, the first pump, the cooler and the first heat exchanger are connected through a first connecting pipe to form an independent cycling system; the direct evaporation type air-conditioning system comprises a second heat exchanger, a second water storage tank and a second pump provided inside the second compartment; the second water storage tank, the second pump and the second heat exchanger are connected through a second connecting pipe to form an independent cycling system; both the first compartment and the second compartment have fresh air inlets, and the second compartment has an air outlet for the air-conditioning unit, the first compartment has a plurality of air outlets provided at a position opposite to the exhaust fan.

Preferably, the chassis has a rectangular structure and comprises a partition panel at a middle portion for dividing the chassis into the first compartment and the second compartment while isolating air passage between the first compartment and the second compartment.

Preferably, the fresh air inlets are provided on two opposing sides of the first compartment which are connected through the partition panel, a netlike panel is provided on the fresh air inlet of the first compartment for each the fresh air inlet; the exhaust fan is positioned at a middle portion of the first compartment, the air outlets are provided at one side of said first compartment which is opposite to the partition panel.

Preferably, the fresh air inlet is provided on one side of the second compartment which is connecting to the partition panel, and a rainproof hat is provided at a position outside the fresh air inlet, the air outlet for the air-conditioning unit is provided at another side of the second compartment which is connecting to the partition panel.

Preferably, the first fan unit is connected to the fresh air inlet of the second compartment through an inlet unit, the evaporator is mounted between an outlet of the first fan unit and the air outlet for the air-conditioning unit; when the air-conditioning unit includes the surface cooler cooling system of the surface cooler cooling system and the direct evaporation type air-conditioning system, the cooler is provided between the outlet of the first fan unit and the evaporator; when the air-conditioning unit includes the direct evaporation type air-conditioning system of the surface cooler cooling system and the direct evaporation type air-conditioning system, the second heat exchanger is positioned close to the air outlet of the air-conditioning unit, the second pump and second water storage tank is positioned close to the second heat exchanger in a bottom portion of the second compartment; the air outlet of the air-conditioning unit has an inner side at which a water shield panel is provided, the water shield panel has a water outlet connecting to the second water storage tank.

Preferably, the surface cooler cooling system comprises two first heat exchangers which are positioned proximal to the two fresh air inlets of the first compartment respectively and are connected through the first connecting pipe; the first water storage tank is provided at a bottom of the first compartment.

Preferably, the refrigerant air-conditioning system comprises two inter-connecting condensers which are positioned proximal to the two fresh air inlets of the first compartment respectively.

Preferably, the unit further comprises an electrical control unit positioned inside the second compartment.

Preferably, the first fan unit is a centrifugal fan, the evaporator is a fin type evaporator, and the condenser is a fin type condenser.

Preferably, both the first heat exchanger and the second heat exchanger are heat exchanger with honeycomb-shaped and multi-layered corrugated fiber.

The advantageous effect of the air-conditioning unit with hybrid cooling of the present invention includes a conventional refrigerant air-conditioning system, and further includes at least one of the surface cooler cooling system and the direct evaporation type air-conditioning system. Accordingly, at least two air-conditioning systems which can be work together. This at least two systems can be operated independently or together, therefore capable of providing all weather temperature and humidity control which is energy saving and environmental friendly, and providing the most economical and environmental friendly mode of operation under different temperature and humidity conditions.

DETAILED DESCRIPTION OF THE PREFERRED EMBODIMENT

The present invention is further described in details with the accompanying drawings and embodiments.

Figure 1:
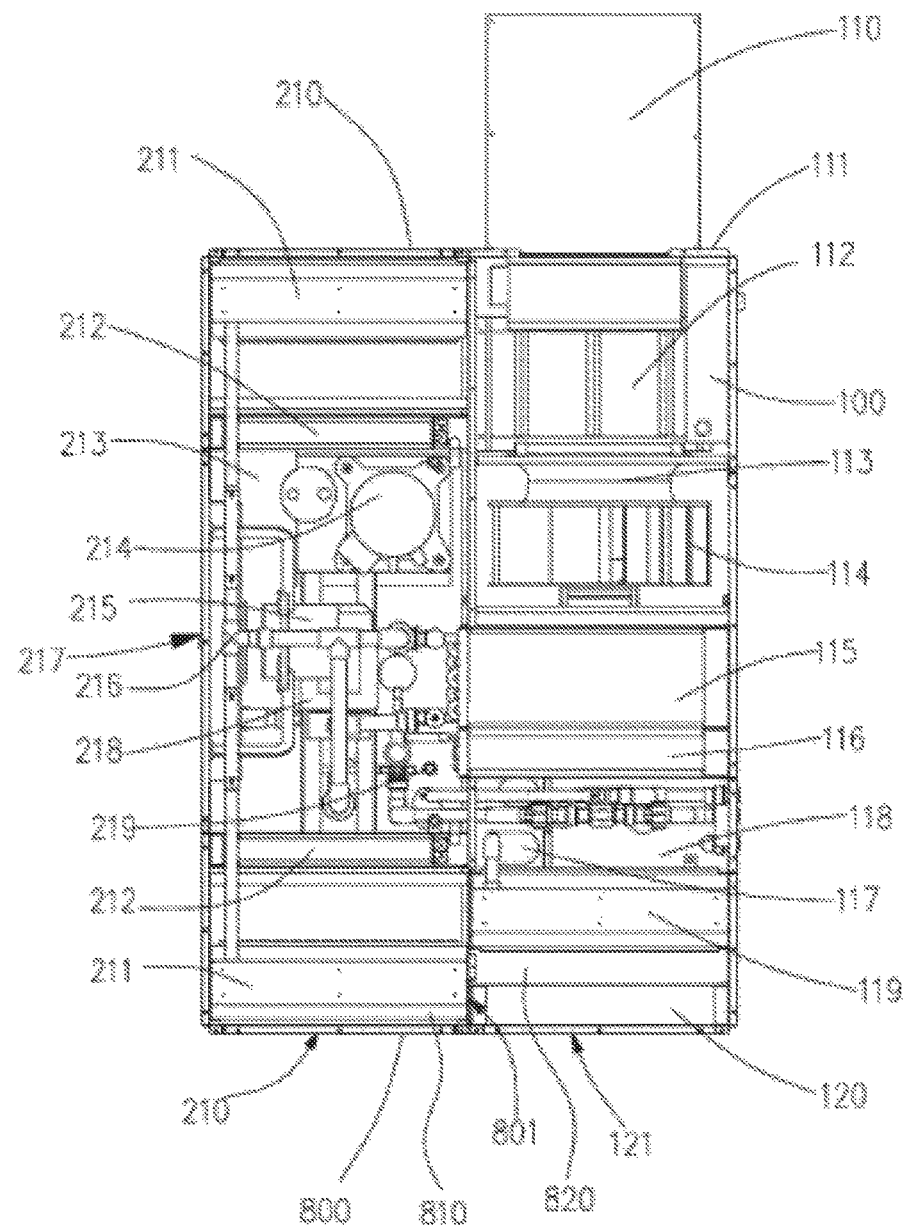
FIG. 1 is a schematic diagram showing the internal structures of a air conditioning unit with hybrid cooling according to a preferred embodiment of the present invention.
Figure 2:
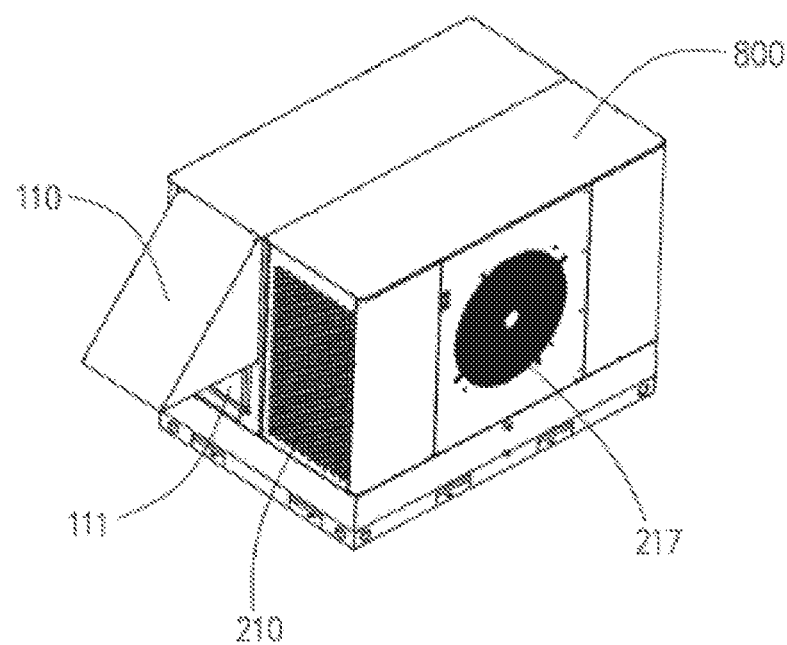
FIG. 2 is a perspective view of a air-conditioning unit with hybrid cooling according to a preferred embodiment of the present invention.

Referring to FIG. 1 of the drawings, according to a preferred embodiment of the present invention, a air-conditioning unit with hybrid cooling comprises a chassis 800 which is a generally rectangular box shaped structure; and a refrigerant air-conditioning system, a surface cooler cooling system and a direct evaporation type air-conditioning system inside the chassis 800. These three systems can operate independently, any two of them can operate together and all three of them can operate at the same time.

Wherein, the chassis 800 comprises a partition panel 801 at a middle portion to divide the chassis 800 into a first compartment 810 and a second compartment 820, the partition panel 801 is also used to provide air passage isolation between the first compartment 810 and the second compartment 820. The partition panel 801 has a plurality of piping holes and wiring holes solely for connecting the corresponding parts between the two compartments.

The first compartment 810 has two opposing sides which are connected through the partition panel 801 and fresh air inlets are provided on the two sides. The first compartment 810 comprises a netlike panel 210 provided at the fresh air inlet for the two fresh air inlets to filter large granular particles in the air. The first compartment 810 has a circular air outlet provided one side which is opposite to the partition panel 801 and comprises an air outlet panel 217 mounted to the air outlet. The air outlet panel 217 is a sheet metal which has a plurality of large circular holes or rectangular holes. The fresh air from outside enters into the chassis through the netlike panels 210 at two ends of the first compartment and exits from the air outlet panel 217 to outside, therefore the first compartment 810 can also be referred to as an external side compartment.

The second compartment 820 has one side which is connected to the partition panel 801 and a fresh air inlet is provided thereon and an air inlet panel 111 is mounted onto the fresh air inlet. The second compartment 820 comprises a rainproof hat 110 provided on an external side of the fresh air inlet for preventing rain water from entering into the second compartment 820. The rainproof hat 110 has an inlet at which a filter mesh can be installed. The air inlet panel 111 is a sheet metal which may include a plurality of large circular holes or rectangular holes. The second compartment 820 has an air outlet 121 for the air-conditioning unit at another side which is connected to the partition panel 801. The air outlet 121, through air ducts, transports the air output from the full fresh air-conditioning unit with hybrid cooling of the present invention to a predetermined space. The outside fresh air enters into the chassis through the air inlet panel 111 at one side of the second compartment and exits from the air outlet 121 to an interior area, therefore the second compartment 820 can also be referred to as an internal side compartment.

The refrigerant air-conditioning system of the present invention is similar to a conventional refrigerant air-conditioning system and mainly comprises a compressor 214, a condenser 212, an expansion valve 219, an exhaust fan 215, an evaporator 116 and a first fan unit 114. These parts' structure, connection and working principles are the same as the conventional refrigerant air-conditioning system, and are not repeated here. In particular, the compressor 214, the condenser 212, the expansion valve 219 and the exhaust fan 215 are installed inside the first compartment 810. The evaporator 116 and the first fan unit 114 are installed inside the second compartment 820. Preferably, the refrigerant employs high efficient environmental friendly refrigerants such as R134a, R407c or R410A.

The first fan unit 114 employs a centrifugal fan in which its air inlet is connected to the air inlet panel 111 through an inlet 113 and an inlet unit 112, therefore after the outside fresh air enters into the air inlet panel 111, all the fresh air will enter into the first fan unit 114. The full fresh air-conditioning unit with hybrid cooling comprises an electrical control unit 100 near the air inlet panel 111, and particularly, is at one side of the inlet unit 112. Preferably, the evaporator 116 is a fin type evaporator and is mounted between the outlet of the first fan unit 114 and the air outlet 121 of the air-conditioning unit such that the air blown from the first fan unit 114 will pass through the evaporator 116 and have changes in temperature.

Preferably, the condenser 212 is a fin type condenser. According to this embodiment, two inter-connecting condensers 212 are provided near the two netlike panels 210 at two sides of the first compartment 810 respectively. The exhaust fan 215 is installed in the middle portion of the first compartment 810 and its outlet is facing directly to the air outlet panel 217. The compressor 214 and the expansion valve 219 are provided at two sides of the exhaust fan 215 respectively. The exhaust fan 215 sucks air from the two sides of the first compartment and blow out the air from the air outlet panel 217 in the middle portion, therefore providing heat dissipation effect to each internal parts of the chassis.

The surface cooler cooling system mainly comprises a first water storage tank 213, a first pump 218 and a first heat exchanger 211 provided inside the first compartment 810, and a cooler 115 inside the second compartment 820. The first water storage tank 213, the first pump 218, the cooler 115 and the first heat exchanger 211 are connected through a first connecting pipe 216 to form an independent cycling system. Wherein two first heat exchangers 211 are employed and positioned near to the two netlike panels 210 at two sides of the first compartment respectively, and are connected through the connecting pipe 216. In particular, the first heat exchanger 211 is installed between the netlike panel 210 and the condenser 212, while the first heat exchanger 211 employs a heat exchanger with honeycomb-shaped and multi-layered corrugated fiber. The first water storage tank 213 in installed at a bottom portion of the first compartment 810, and, in this particular embodiment, is installed between the exhaust fan 215, the compressor 214 and one of the condensers 212. The cooler 115 is installed inside the second compartment 820 between the outlet of the first fan unit 114 and the evaporator 116. It is appreciated that the cooler 115 can be installed at any position between the outlet of the first fan unit 114 and the air outlet 121.

The work principle of the surface cooler cooling system: the water inside the first water storage tank 213 (the water temperature is lower than room temperature) under the effect of the first pump 218 is supplied to the cooler 115. At the same time, the outside fresh air under the effect of the first fan unit 114 is forced to flow through and washing the cooler 115 such that the heat in the air is transferred to the water inside the cooler 115, thereby the air temperature is lowered. The water flow of the cooler 115 absorbs the heat and is guided to flow through the first connecting pipe 216 to the first heat exchanger 211 and then finally flows back to the first water storage tank 213. Inside the first heat exchanger 211, the water at high temperature under the effect of the exhaust fan 215 is forced to evaporate and dissipate the heat, thus the water temperature is lowered. Inside the first compartment, a strong convention is formed by the exhaust fan and the two fresh air inlets at two sides of the first compartment, and a great airflow energy is provided. Also, the heat exchangers (the first heat exchanger) at the two sides of the fresh air inlet employ honeycomb-shaped and multi-layered corrugated fiber construction, and a correspondingly, a pump for cooler with a large water supply is also used, therefore, the water evaporation on the parts of the first heat exchanger parts can carry away a great volume of latent heat while dramatically lowered the water temperature of the water flow from the heat exchanger with honeycomb-shaped and multi-layered corrugated fiber, hence cooled water is provided to the cooler.

The surface cooler cooling system utilized cooled water as the medium to enter into the second compartment for lowering the temperature of the air inside the second compartment, while the source of cooled water of the cooler is the low temperature water formed through evaporation from the exhaust fan in the second compartment and the heat exchanger with honeycomb-shaped and multi-layered corrugated fiber, thus the cooling effect at the first stage cooling is relatively significant and energy saving. When the environmental temperature is relatively high, the refrigerant air-conditioning system and the surface cooler cooling system are operated together to provide a very significant cooling effect and can be operated continuously under the condition of high temperature (temperature of the high temperature air is lowered through the first heat exchanger, then is further lowered by the condenser of the refrigerant air-conditioning system, thus significant cooling effect is provided), which is very difficult to achieve in conventional air-conditioning system.

The direct evaporation type air-conditioning system mainly comprises a second heat exchanger 119, a second water storage tank 118 and a second pump 117. The direct evaporation type air-conditioning system is the only system which has all its parts installed inside the second compartment 820. The second heat exchanger 119, the second water storage tank 118 and the second pump 117 are connected through a second connecting pipe to form an independent cycling system. The second heat exchanger 119 employs a heat exchanger with honeycomb-shaped and multi-layered corrugated fiber and is preferably positioned between the evaporator 116 and the air outlet 121. Since the air output has a relatively high humidity, the second pump 117 and the second water storage tank 118 is provided near the second heat exchanger 119 of the second compartment at a bottom portion.

The work principle of the direct evaporation type air-conditioning system is that the outside fresh air under the effect of the first fan unit 114 is forced to flow and wash the second heat exchanger 119 such that the heat in the air is transferred to the water inside the second heat exchanger 119, thereby the air temperature is lowered (the heat is absorbed through water evaporation, and the temperature of both air and water is lowered) The water from the second heat exchanger 119 is supplied through the second pump 117 from the second water storage tank 118, after flowing through the second heat exchanger 119 to return back to the second water storage tank 118. The direct evaporation type air-conditioning system utilizes the latent heat of vaporization from water and the proportion of sensible heat is very low.

Since the air output from the second heat exchanger 119 is relatively great, the air outlet 121 of the air-conditioning unit includes a water shield panel 120 at its inner side so as to prevent water droplets being carried by the airflow. The water shield panel 120 has a water outlet connecting to the second water storage tank 118. The water shield panel 120 can be manufactured by ABS (Acrylonitrile butadiene styrene) and can retain the relatively great water droplets in the air.

The present invention mainly makes use of a free combination of the surface cooler cooling system, the high efficiency and environmental friendly refrigerant air-conditioning system, and the direct evaporation type air-conditioning system (air-conditioning system equipped with heat exchanger with honeycomb-shaped and multi-layered corrugated fiber) to realize a multi-stage cooling. In particular, the side of the first compartment (exterior side) is mainly function to provide cooled water to the cooler and provide heat dissipation for the compressor condenser, while the side of the second compartment (inner side) is mainly function to process multi-stage treatment of air entering to the internal space. The inner side and the exterior side are connected to form an integral structure and is divided by a partition panel.

When all the three air-conditioning system are operated at the same time, after the outside fresh air is passing through the exhaust fan 215, the air flows through the corresponding netlike panel 210 to the first heat exchanger. The relative pressure of the air at the position of the first heat exchanger 211 is a negative pressure. The hot water flowing from the outlet of the cooler 115 is pouring down through the first heat exchanger. When sufficient contact is made between the water droplets and air, evaporation will occur under the effect of pressure because there is the pressure difference between the air and water vapor, then the heat from the water is removed and the water temperature is lowered. The cooled water flows to the first water storage tank 213, through the first pump 218 to provide water supply to the cooler 115. The cooler 115 further has heat exchange with the air entering in the inlet unit 112 (first stage cooling). Under the effect of the first fan unit 114, the fresh air with lowered loading will have heat exchange with the fin-type evaporator 116 again such that the temperature and humidity will decrease at the same time (second stage cooling and de-humidification). Finally, when passing through the second heat exchanger 119, the air with low temperature and low enthalpy will undergo a third stage cooling and humidity adjustment. The recycling water in the second heat exchange 119 is under the ambient condition of lowered temperature and humidity, the water temperature is between the dry bulb temperature and the wet bulb temperature of the cooled air from the evaporator, the water absorbs heat and evaporates, thus the air temperature is lowered again (third stage cooling and humidifying) while the relative humidity of the air is increased. In order to prevent the air from the second heat exchanger 119 to carry water droplets to inside, the water shield panel 120 is provided between the second heat exchanger 119 and the air outlet 121. Accordingly, after the outside fresh air is flowing from the inner side by the centrifugal fan 114 to the cooler 115, the evaporator 116, the second heat exchanger 119 for cooling, then enter inside from the air outlet at the inner side through the water shield panel 120.

According to the present invention, after the outside air passes through the cooler, the fin-type evaporator and the heat exchanger with honeycomb-shaped and multi-layered corrugated fiber in the second compartment (the second heat exchanger) for first-, second- and third-stage treatment, the temperature difference in the outlet of the second compartment can reach 8~20° C. Under different environmental conditions, switching to different operation mode can achieve the maximum power saving and cooling effect.

In other embodiments, based on the actual requirements, the full fresh air-conditioning unit with hybrid cooling of the present invention can include only the refrigerant air-conditioning system and the surface cooler cooling system, or only the refrigerant air-conditioning system and the direct evaporation type air-conditioning system.

One skilled in the art will understand that the embodiment of the present invention as shown in the drawings and described above is exemplary only and not intended to be limiting. It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A air-conditioning unit with hybrid cooling comprising a chassis and a refrigerant air-conditioning system provided inside the chassis, characterized in that:
   said air-conditioning unit further comprising at least one of a surface cooler cooling system and a direct evaporation type air-conditioning system inside the chassis;
   said chassis comprises a first compartment and a second compartment; said refrigerant air-conditioning system comprises a compressor, a condenser, an expansion valve and an exhaust fan which are positioned inside said first compartment; and an evaporator and a first fan unit which are positioned inside said second compartment;
   said surface cooler system comprises a first water storage tank, a first pump and a first heat exchanger provided inside said first compartment; and a cooler provided inside said second compartment, wherein said first water storage tank, said first pump, said cooler and said first heat exchanger are connected through a first connecting pipe to form an independent cycling system;
   said direct evaporation type air-conditioning system comprises a second heat exchanger, a second water storage tank and a second pump provided inside said second compartment; said second water storage tank, said second pump and said second heat exchanger are connected through a second connecting pipe to form an independent cycling system;
   both said first compartment and said second compartment have fresh air inlets, and said second compartment has an air outlet for the air-conditioning unit, said first compartment has a plurality of air outlets provided at a position opposite to said exhaust fan.

2. The air-conditioning unit with hybrid cooling according to claim 1, characterized in that: said chassis has a rectangular structure and comprises a partition panel at a middle portion for dividing said chassis into said first compartment and said second compartment while isolating air passage between said first compartment and said second compartment.

3. The air-conditioning unit with hybrid cooling according to claim 2, characterized in that: said fresh air inlets are provided on two opposing sides of said first compartment which are connected through said partition panel, a netlike panel is provided on said fresh air inlet of said first compartment for each said fresh air inlet; said exhaust fan is positioned at a middle portion of said first compartment, said air outlets are provided at one side of said first compartment which is opposite to said partition panel.

4. The air-conditioning unit with hybrid cooling according to claim 2, characterized in that: said fresh air inlet is provided on one side of said second compartment which is connecting to said partition panel, and a rainproof hat is provided at a position outside said fresh air inlet, said air outlet for said air-conditioning unit is provided at another side of said second compartment which is connecting to said partition panel.

5. The air-conditioning unit with hybrid cooling according to claim 1, characterized in that: said first fan unit is connected to said fresh air inlet of said second compartment through an inlet unit, said evaporator is mounted between an outlet of said first fan unit and said air outlet for said air-conditioning unit;
   when said air-conditioning unit includes said surface cooler cooling system of said surface cooler cooling system and said direct evaporation type air-conditioning system, said cooler is provided between said outlet of said first fan unit and said evaporator;
   when said air-conditioning unit includes said direct evaporation type air-conditioning system of said surface cooler cooling system and said direct evaporation type air-conditioning system, said second heat exchanger is positioned close to said air outlet of said air-conditioning unit, said second pump and second water storage tank is positioned close to said second heat exchanger in a bottom portion of said second compartment; said air outlet of said air-conditioning unit has an inner side at which a water shield panel is provided, said water shield panel has a water outlet connecting to said second water storage tank.

6. The air-conditioning unit with hybrid cooling according to claim 1, characterized in that: said surface cooler cooling system comprises two said first heat exchangers which are positioned proximal to said two fresh air inlets of said first compartment respectively and are connected through said first connecting pipe; said first water storage tank is provided at a bottom of said first compartment.

7. The air-conditioning unit with hybrid cooling according to claim 1, characterized in that: said refrigerant air-conditioning system comprises two interconnecting condensers which are positioned proximal to said two fresh air inlets of said first compartment respectively.

8. The air-conditioning unit with hybrid cooling according to claim 1, characterized in that: said unit further comprises an electrical control unit positioned inside said second compartment.

\* \* \* \* \*